United States Patent

[11] 3,545,389

[72] Inventors Frederick N. Stephens,
Leawood, Kans., and
Robert R. Vetter and Stuart J.
Burhans, Kansas City, Mo.
[21] Appl. No. 422,643
[22] Filed Dec. 31, 1964
[45] Patented Dec. 8, 1970
[73] Assignee Stephens Industries, Inc.
Kansas City, Missouri
a corporation of Missouri

[54] MERCHANDISE TAGGING APPARATUS
14 Claims, 21 Drawing Figs.
[52] U.S. Cl. ............................................. 112/104;
93/87; 156/92, 156/253, 156/513, 156/566,
156/570; 161/54; 271/44
[51] Int. Cl. ..................................................... B65c 5/00,
B65c 9/12, G09f 3/14
[50] Field of Search .......................................... 40/20;
161/48, 50—54; 156/91—93, 250, 252, 253,
510—522, 530, 563, 564, 565, 573, 566, 441, 570;
1/323, 131, 90; 112/104, 154, 217.2; 93/87—92;
271/44

[56] References Cited
UNITED STATES PATENTS
1,275,960   8/1918   Maynard ..................... 271/44
1,580,984   4/1926   Young ......................... 93/91
1,854,647   4/1932   Flood ......................... 93/88UX
2,559,828   7/1951   Ogden ......................... 93/88X
3,025,054   3/1962   Clemens et al. ............. 93/87UX
495,414     4/1893   Hughes et al. ............... 156/563UX
1,877,488   9/1932   Allen .......................... 156/441
2,510,693   6/1950   Green ......................... 156/441UX
2,665,509   1/1954   Flood ......................... 161/50UX
3,122,465   2/1964   Keller et al. ................. 156/93
3,243,332   3/1966   Dritz .......................... 156/93X
3,320,106   5/1967   Kirkpatrick et al. .......... 156/91X FOREIGN PATENTS
460,913    11/1949   Canada ....................... 93/88

Primary Examiner—Robert F. Burnett
Assistant Examiner—William A. Powell
Attorney—Shenier & O'Connor ABSTRACT: Automatic apparatus for securing tags to articles of merchandise, such as articles of wearing apparel, in which a length of normally solid thermoplastic material is advanced from a supply through a deflected assembly of a superposed tag and fabric, is cut, and the ends of the length are heated to melt the material to form retaining heads on the ends thereof which prevent the tag from being removed from the article without tearing the tag or removing one of the heads.

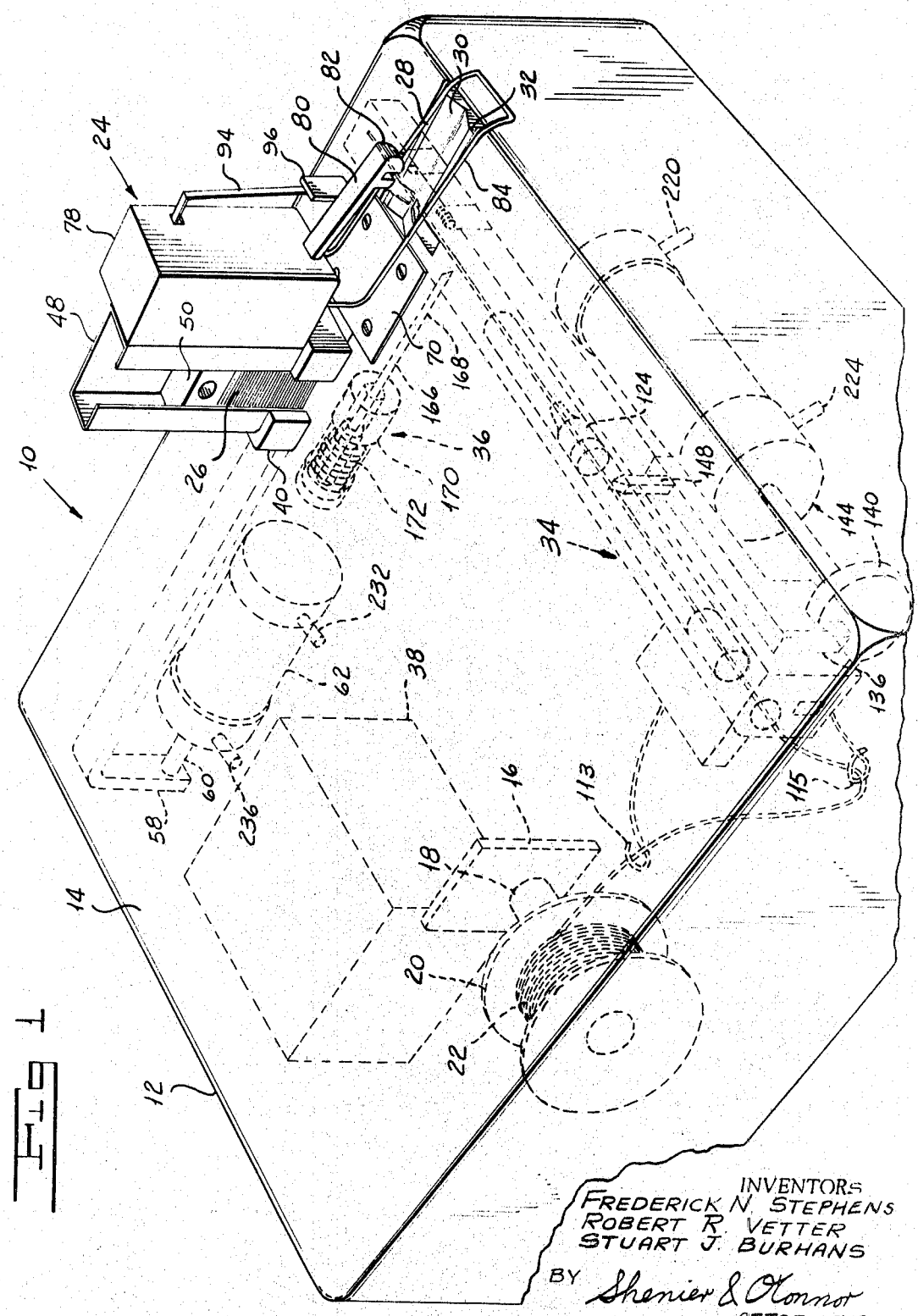

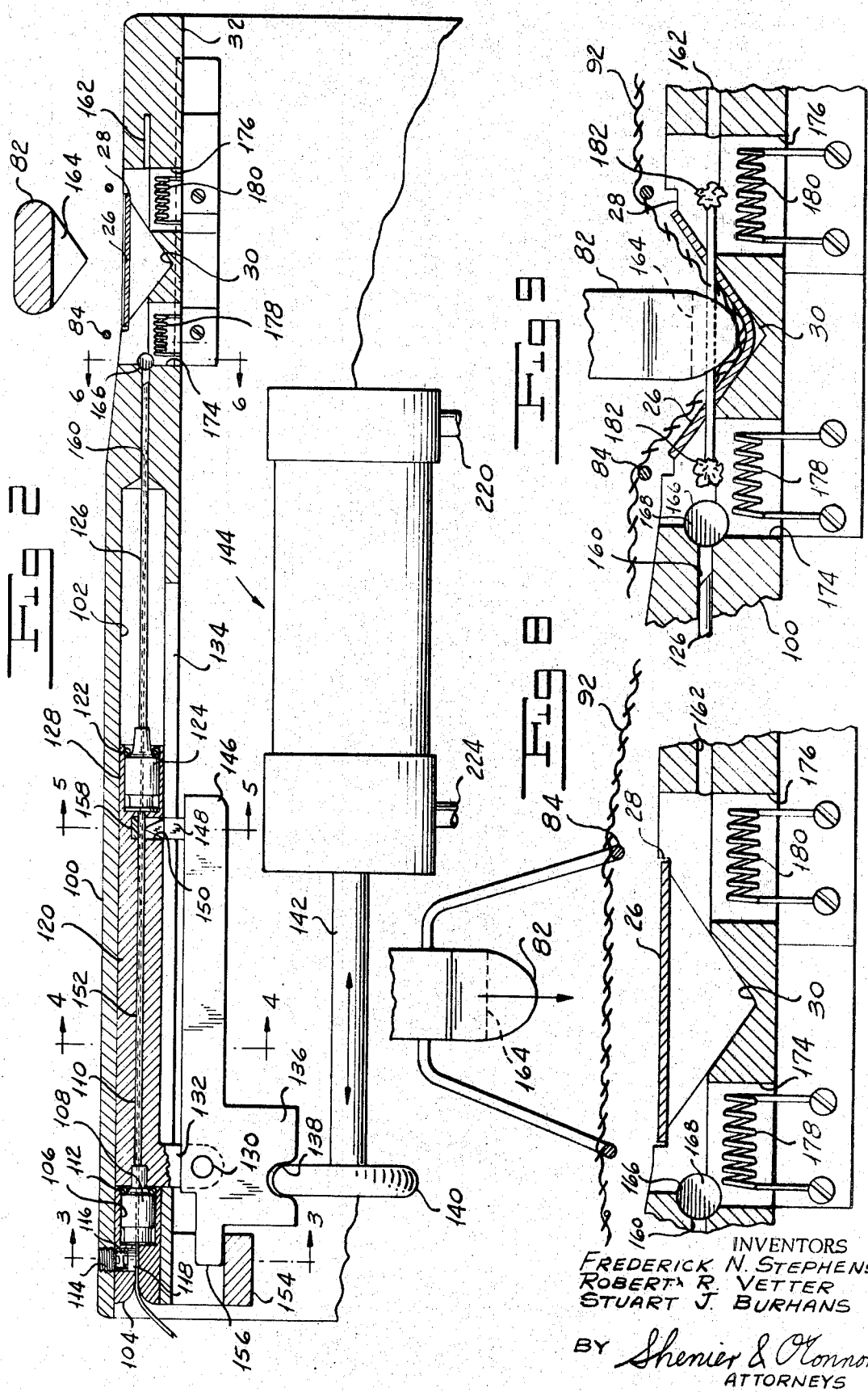

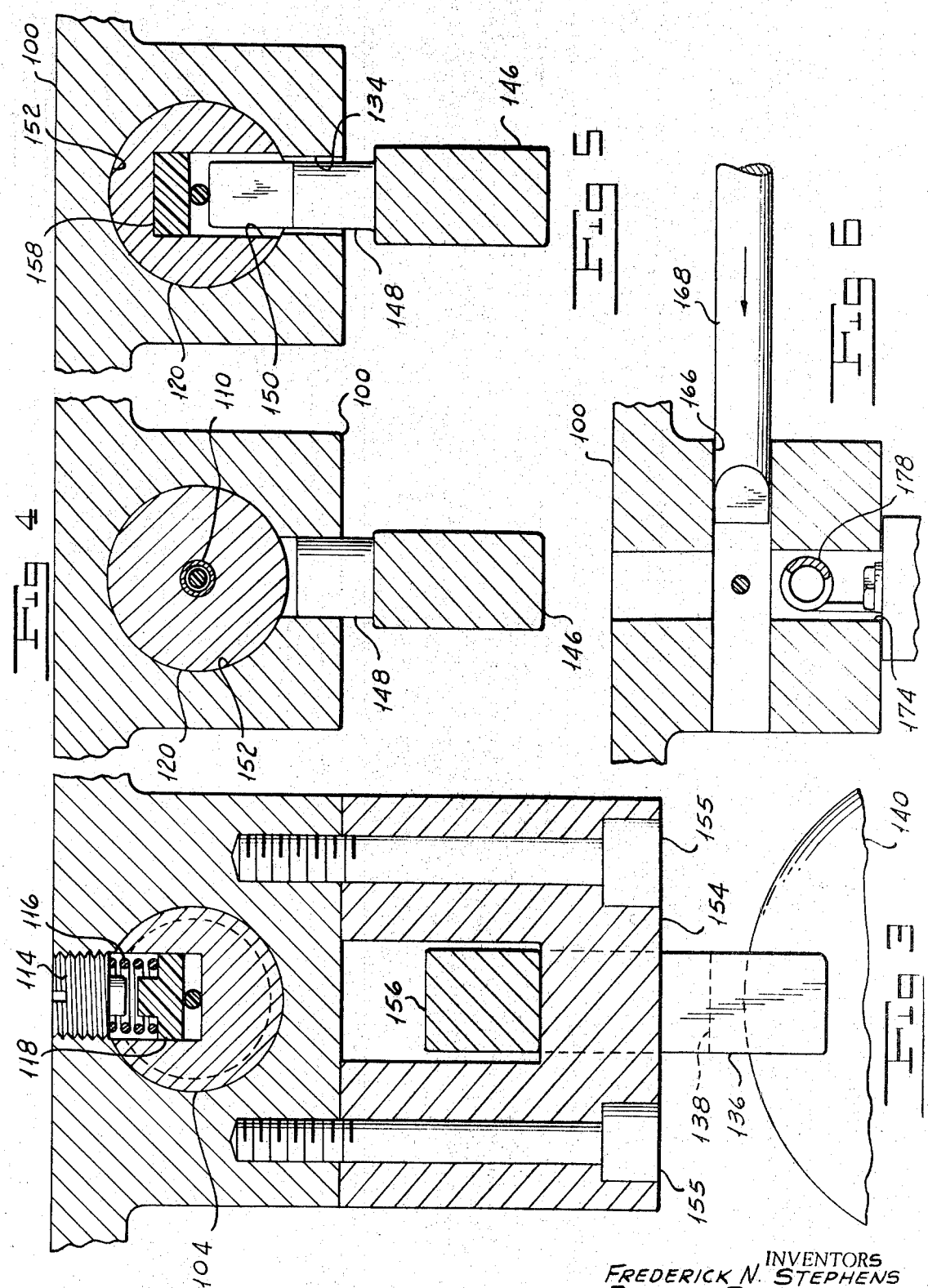

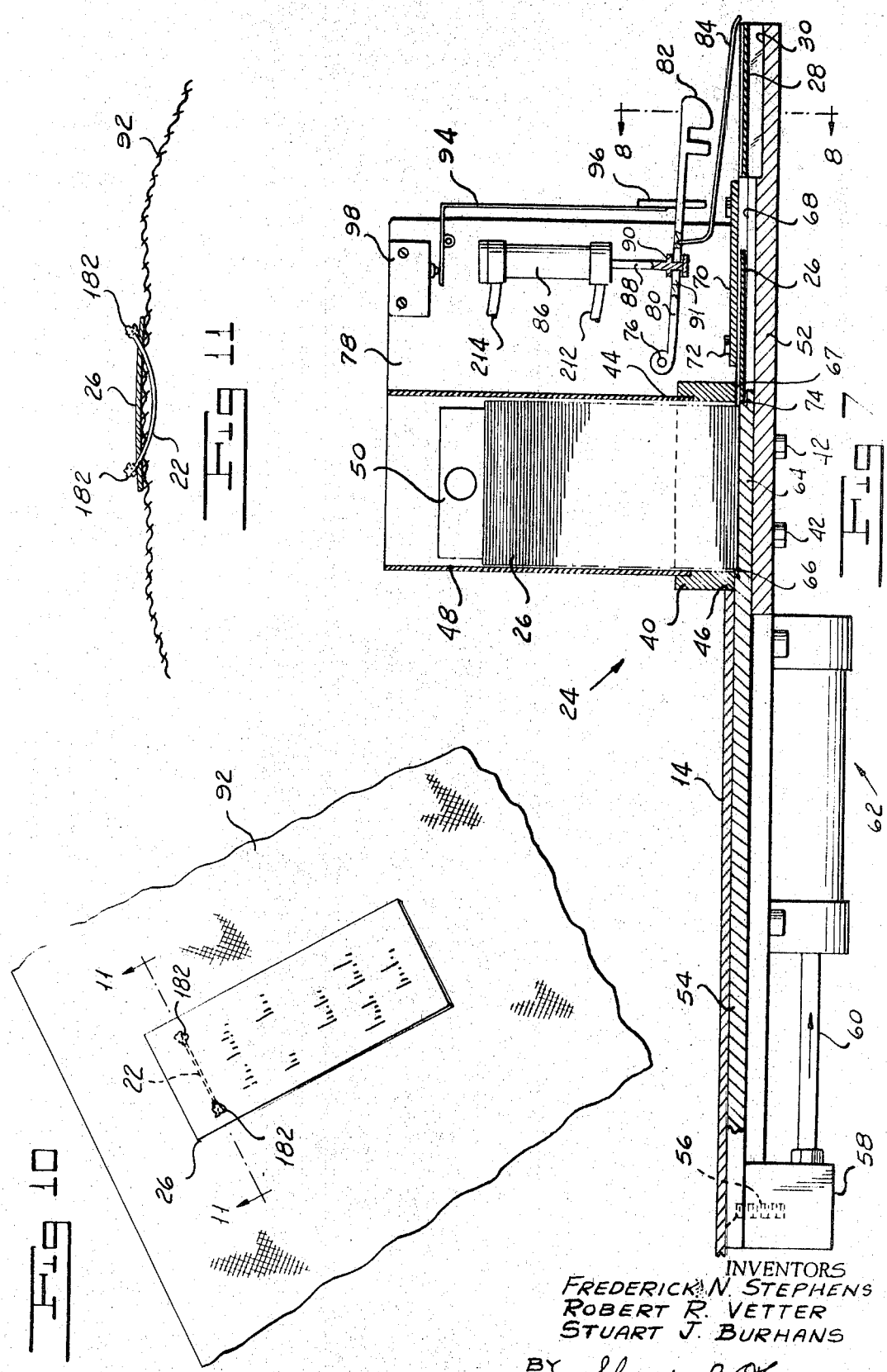

INVENTORS
FREDERICK N. STEPHENS
ROBERT R. VETTER
STUART J. BURHANS

BY Shenier & O'Connor
ATTORNEYS

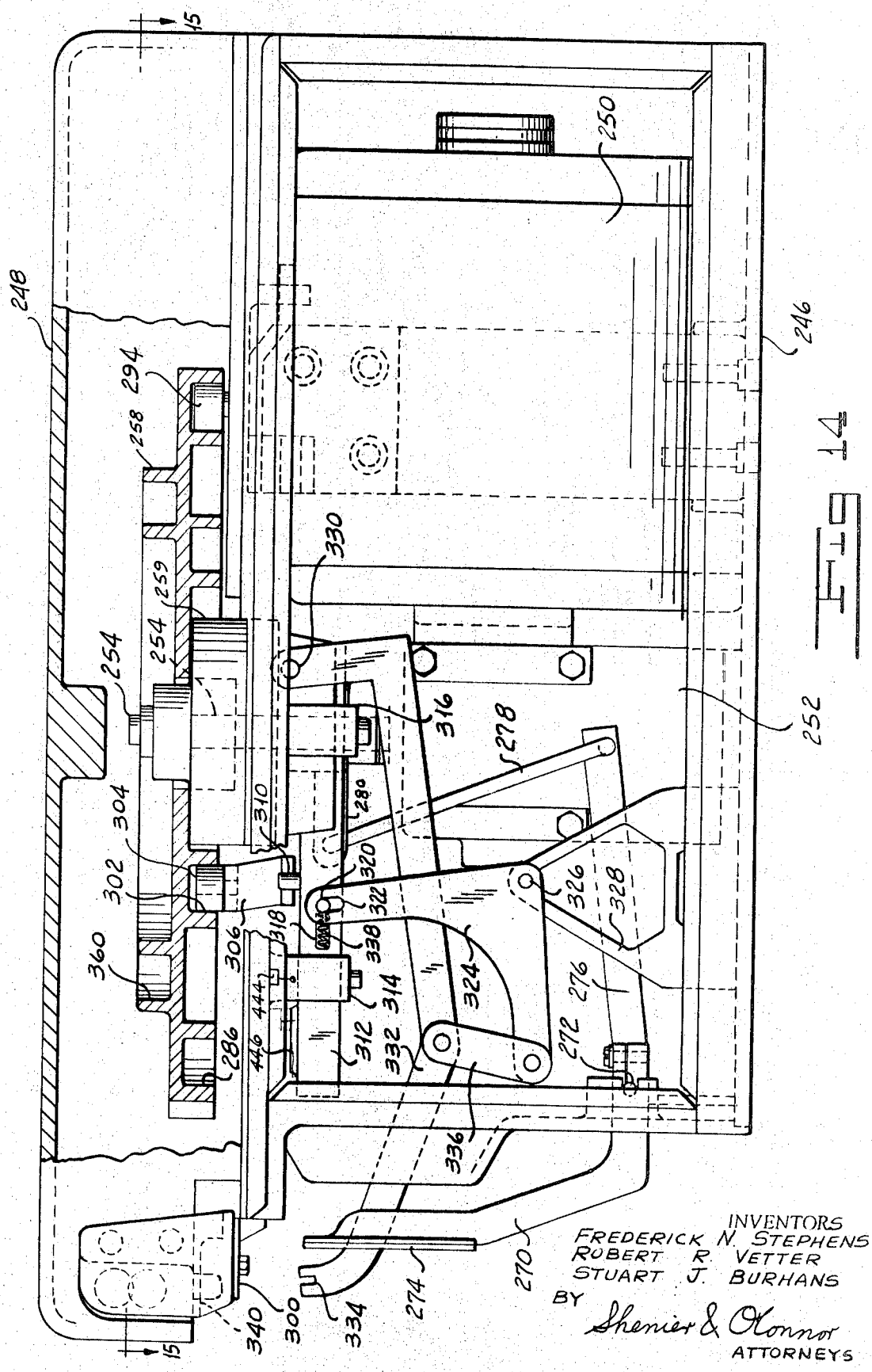

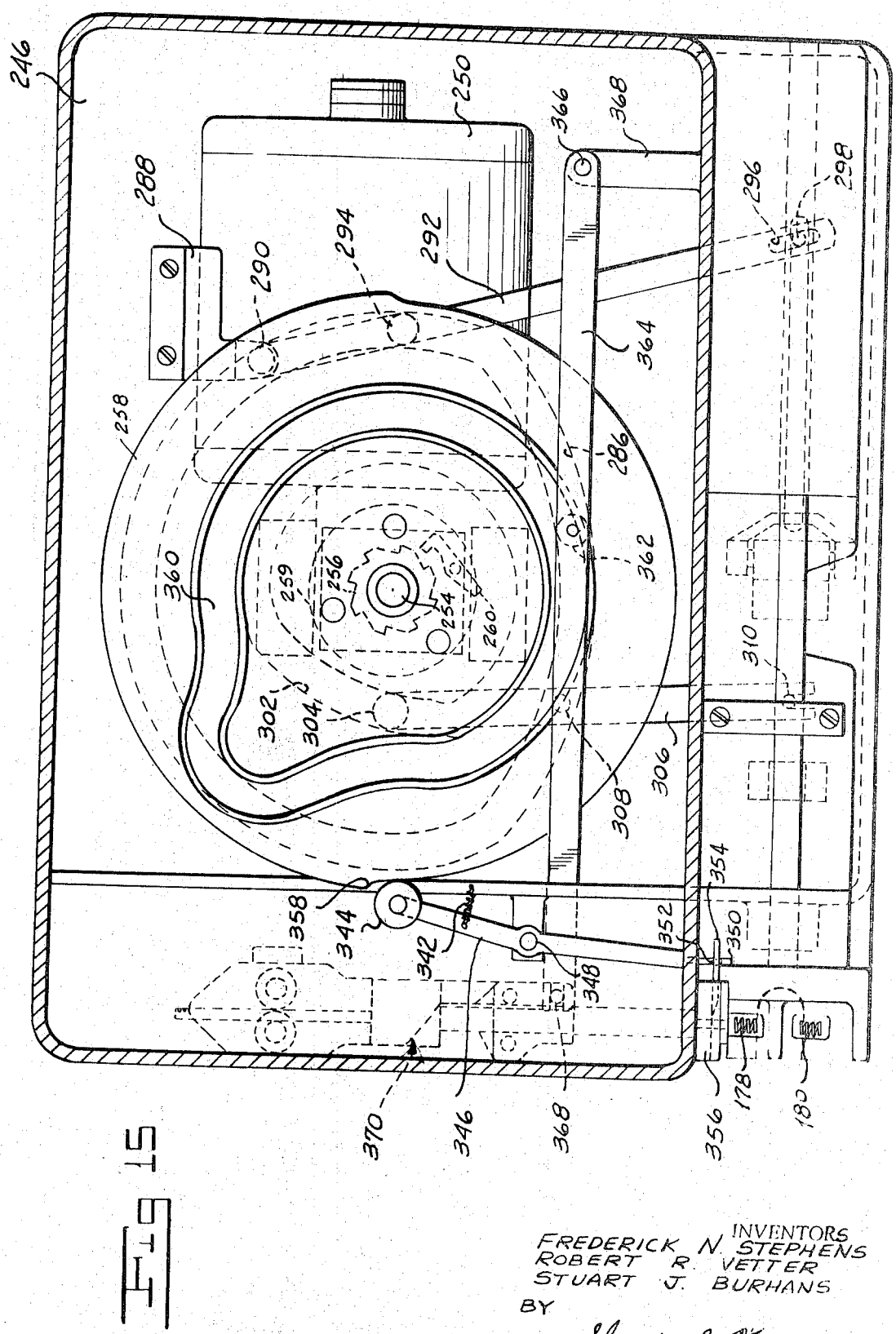

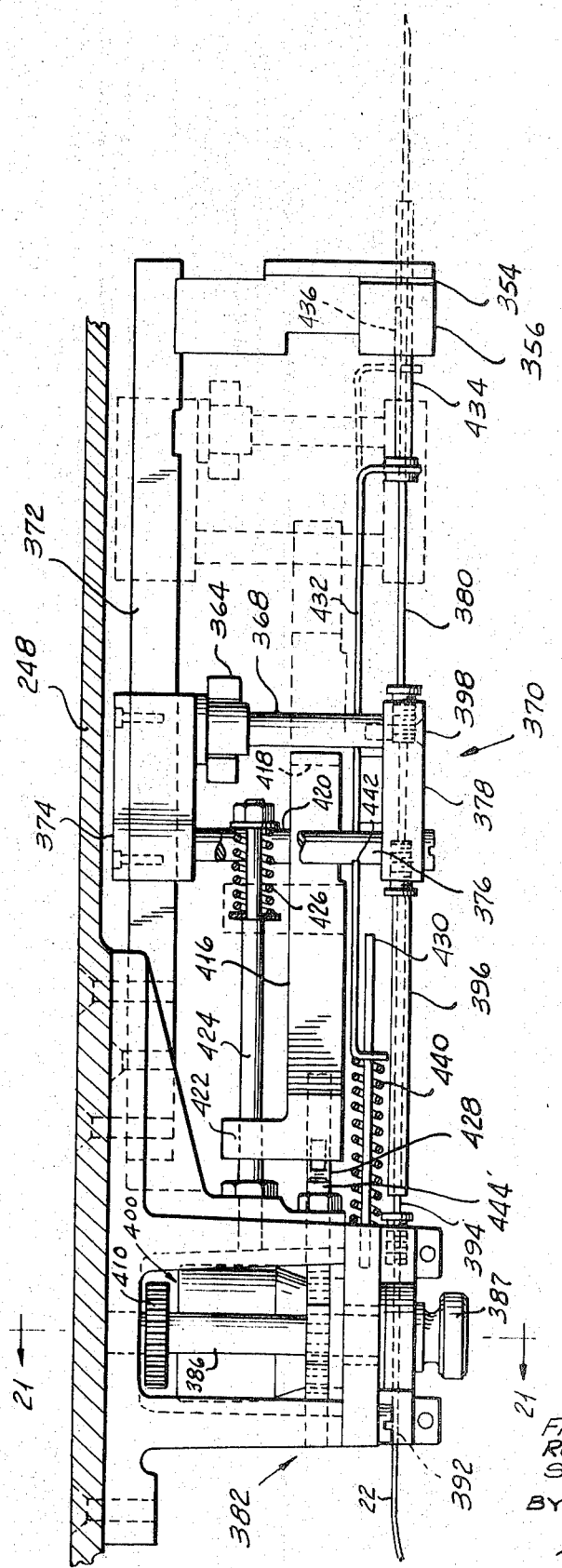

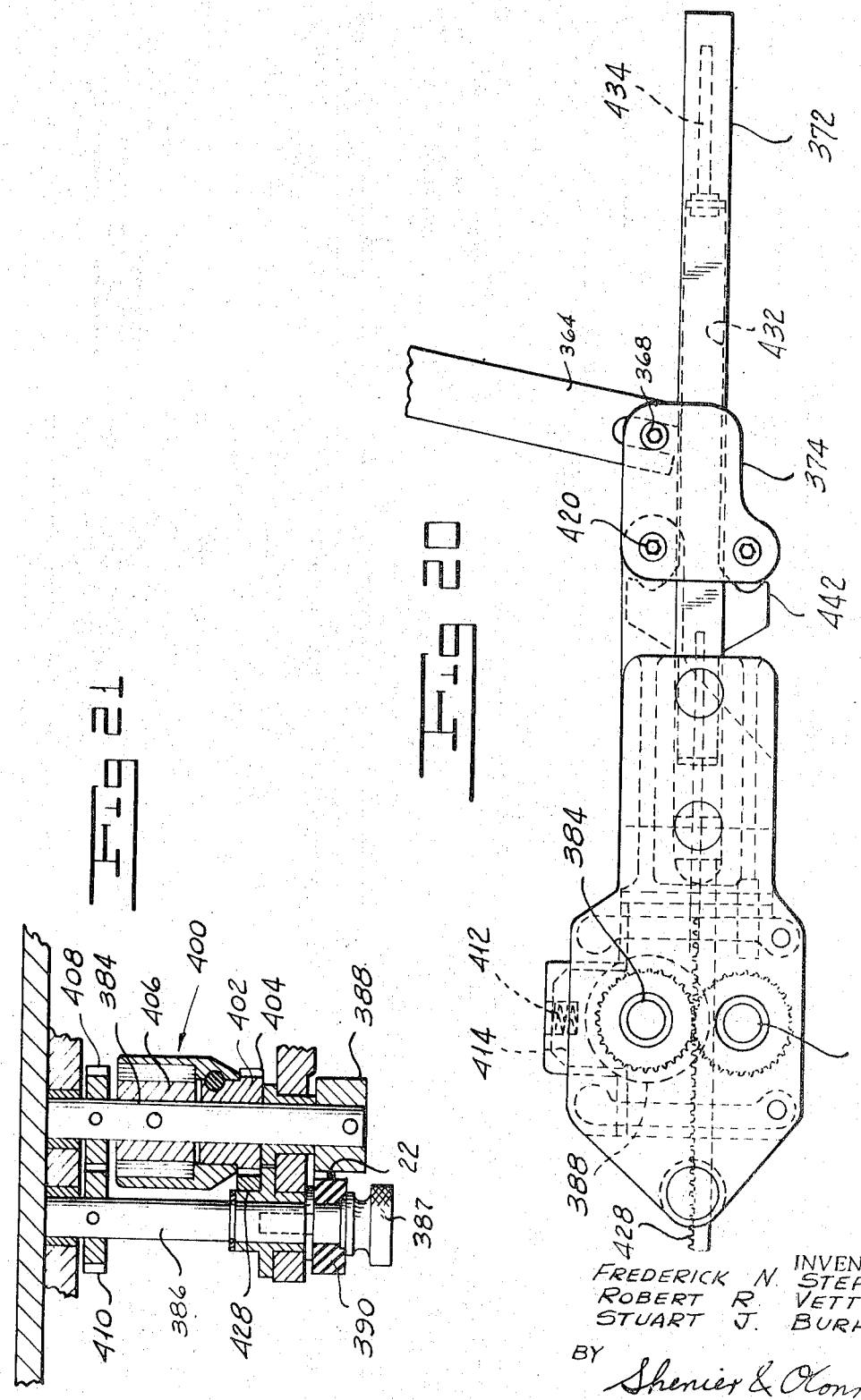

MERCHANDISE TAGGING APPARATUS

Our invention relates to a merchandise tagging method and means for effecting the same and more particularly to an improved system for tagging merchandise which is more secure, simpler and less expensive than are systems used in the prior art.

One of the most common methods of securing price and inventory tags to merchandise such, for example, as articles of apparel and the like, is the insertion of a common pin successively through the tag, the merchandise and back through the tag. The operation may be accomplished automatically.

Other various forms of tagging merchandise are known in the art. For example, tags may be secured to articles by an adhesive.

Most methods of tagging merchandise commonly used in the prior art embody a serious defect. That is, they permit "retagging" of merchandise by dishonest persons. A dishonest person may, for example, remove the common pin from a relatively expensive article, destroy the tag secured to the article, and substitute therefor a tag showing a much lower price. This tag switching is virtually undetectable. Thus, as is often the case, if the clerk is not alert or is unfamiliar with the price of the article, considerable loss to the merchandiser results.

In addition to the problem outlined above of retagging of merchandise by dishonest persons, tag fastening means of the prior art incorporate a number of other defects. Metal fasteners are of course subject to corrosion and may stain the garment or the like to which they are applied. Moreover, metal fasteners, such as common pins, may cause injury to sales people and customers handling the goods in the normal way.

A possible solution to the problems outlined above is sewing of portions of the tag to the articles by use of common textile threads. This method, however, is expensive and extremely inconvenient for both the seller and the purchaser.

We have invented a merchandise tagging method and apparatus for effecting the same which overcomes the defects of tagging systems of the prior art. Our arrangement renders futile attempts by dishonest persons to switch tags. Once the fastened tag has been removed from the article, another tag cannot readily be substituted therefor without being immediately detectable. Our system employs a fastener which, while being corrosion resistant, is relatively inexpensive. Our fastener has no sharp points so that it avoids the possibility of injury to persons handling the article to which it is applied. Moreover, use of our fastener is simple and expeditious.

One object of our invention is to provide a merchandise tagging method and apparatus for effecting the same which obviates the problem of ticket switching by dishonest persons.

Another object of our invention is to provide a merchandise tagging method and means for effecting the same which is more secure than are tagging systems of the prior art.

A further object of our invention is to provide a merchandise tagging method and means for effecting the same which is less expensive than are systems of the prior art.

Yet another object of our invention is to provide a merchandise tagging method and means for effecting the same which substantially eliminates the possibility of injury by the fastener.

A still further object of our invention is to provide a merchandise tagging method and means for effecting the same which obviates the problem of damage to the goods by corrosion of the fastener.

Other and further objects of our invention will appear from the following description.

In general our invention contemplates a merchandise tagging method and means for effecting the same in which a length of solid plastic filamentary material is concomitantly fed through a tag and engaged with the article to which the tag is to be applied. After the feeding operation, the length is cut and heat is applied to the ends of the filament length to melt the same to result in the formation of balls or heads of material on the ends of the filament. These heads prevent the tag from being removed from the article without breaking the filamentary length. We provide apparatus for applying our fastener in a rapid and expeditious manner.

In the accompanying drawings which form part of the instant specification and which like are to be read in conjunction therewith and in which like reference numerals are used to indicate like parts in the various views:

FIG. 1 is a perspective view of one form of our merchandise tagging apparatus.

FIG. 2 is a sectional view of the filament feeding portion of the form of our merchandise tagging apparatus shown in FIG. 1.

FIG. 3 is a sectional view of the apparatus shown in FIG. 2 taken along the line 3–3 of FIG. 2 and drawn on an enlarged scale.

FIG. 4 is a sectional view of the filament feeding device shown in FIG. 2 taken along the line 4–4 of FIG. 2 and drawn on an enlarged scale.

FIG. 5 is a sectional view of the filament feeding device shown in FIG. 2 taken along the line 5–5 of FIG. 2 and drawn on an enlarged scale.

FIG. 6 is a sectional view of our merchandise tagging apparatus illustrating the filament cutting mechanism of our apparatus taken along the line 6–6 of FIG. 2 and drawn on an enlarged scale.

FIG. 7 is a fragmentary sectional view of our merchandise ticketing apparatus illustrating the ticket feeding device thereof.

FIG. 8 is a fragmentary sectional view of our merchandise ticketing apparatus taken along the line 8–8 of FIG. 7.

FIG. 9 is a fragmentary sectional view of our merchandise ticketing apparatus illustrating the relative position of the parts after a fastening operation has been initiated.

FIG. 10 is a fragmentary perspective view showing a ticket applied to an article.

FIG. 11 is a sectional view of a ticket applied to an article taken along the line 11–11 of FIG. 10.

FIG. 14 is a side elevation with parts broken away and with other parts shown in section of an alternate form of our apparatus for tagging merchandise.

FIG. 15 is a sectional view of the form of our apparatus shown in FIG. 14 taken along the line 15–15 of FIG. 14.

FIG. 19 is a side elevation of the needle driving mechanism of the form of our apparatus shown in FIG. 14.

FIG. 20 is a plan view of the form of the needle driving mechanism of the embodiment of our apparatus shown in FIG. 14.

FIG. 21 is a fragmentary sectional view of the needle driving mechanism taken along the line 21–21 in FIG. 19.

Figure 13:
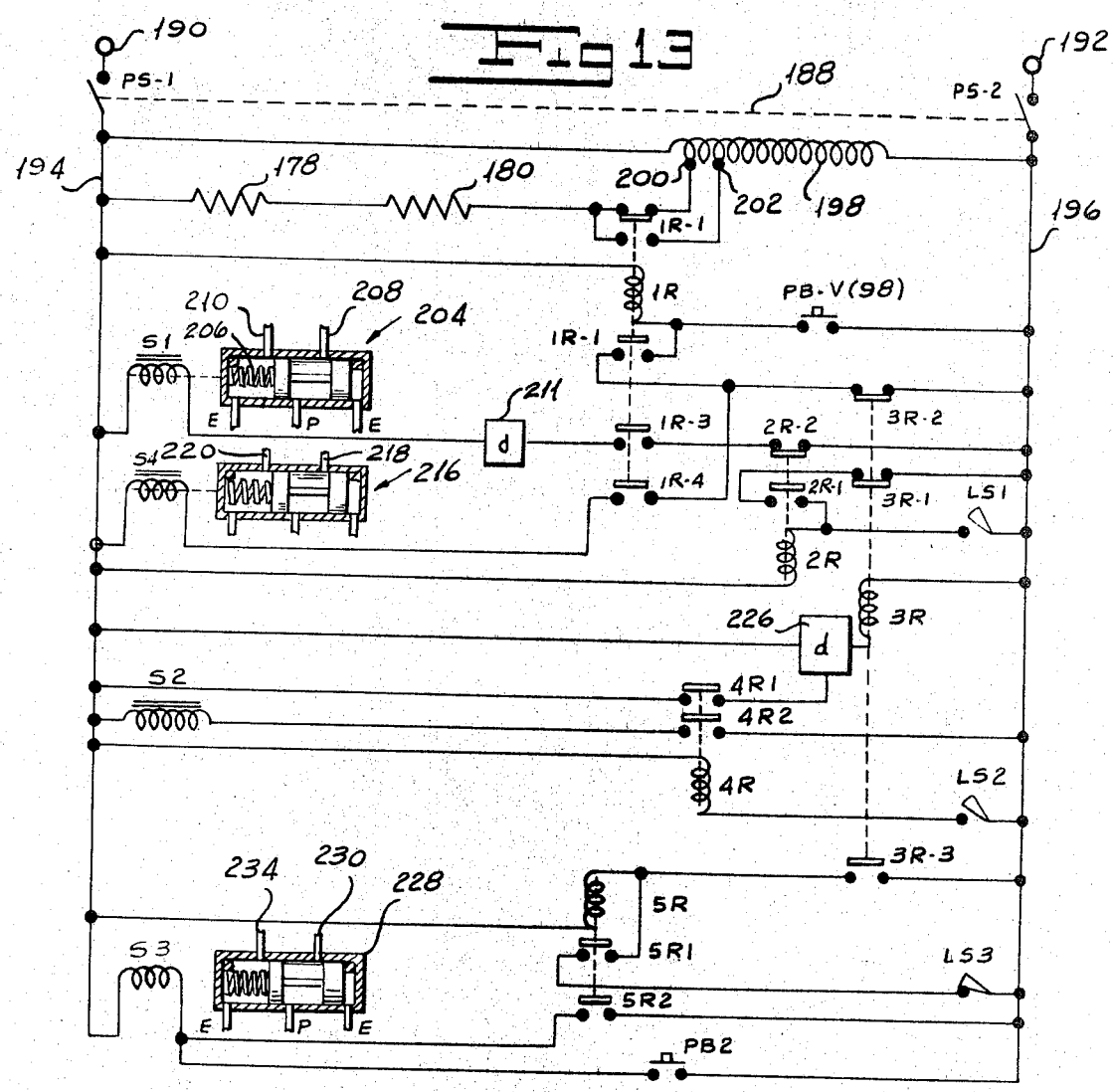
FIG. 13 is a schematic view of one form of control circuit which could be employed on our merchandise ticketing apparatus.

Referring now to FIG. 1 of the drawings, the apparatus of our merchandise tagging system indicated generally by the reference character 10 includes a housing 12 having a top 14. A bracket 16 within the housing carries a shaft 18 which rotatably supports a reel 20 containing a supply of plastic filamentary material 22 such, for example, as polypropylene or the like.

The top 14 supports a ticket supply and feeding mechanism indicated generally by the reference character 24 adapted to be actuated in a manner to be described to feed tickets from a supply of tickets 26 to ledges 28 which support a ticket over a V-shaped recess 30 in a block 32 carried by the top.

Within the housing 12 we mount a filament feeding apparatus, indicated generally by the reference character 34, adapted to be operated to feed length of material from the supply 22 through the ticket and through an article, such as a piece of fabric, to which the ticket is to be secured in a manner to be described. We mount a cutter assembly indicated generally by the reference character 36 within the cabinet and actuate the cutter to cut a length of filamentary material which has been fed through a ticket and through the article to which it is to be applied. A housing 38 within the housing 12 contains the control circuitry to be described hereinafter.

Referring now to FIGS. 1 and 7, the ticket feeding mechanism 24 includes a gate block 40 which is secured to the top 14 by any suitable means such as by screws 42. Gate block 40 is formed with an opening 44 approximately the size of a ticket and is so mounted on the top 14 that the opening forming portion of the gate block is disposed in an opening 46 in the top 14. Gate block 40 receives a magazine 48 adapted to hold the supply of tickets 26. A weight 50 resting on top of the tickets 26 in the magazine 48 urges the tickets downwardly through the opening in the gate block 40.

A base plate 52 secured to the top 14 by the bolts 42 retains a shuttle 54 on the underside of the top 14 for reciprocating movement with respect to the gate block 40. A screw or the like 56 secures the shuttle 54 to a slide block 58 carried by the shaft 60 of a piston and cylinder assembly indicated generally by the reference character 62. We provide the shuttle 54 with a shuttle blade 64 which is normally disposed under the opening in the block 40 so that the supply of tickets 26 rests on the blade.

Shuttle blade 64 has a first step 66 chamfered downward and backward with relation to the drive direction of the shuttle to form a ticket engaging edge adapted to engage the lowermost ticket of the supply 26. The height of the step 66 is somewhat less than the thickness of a ticket 26 so that the edge of the step engages the lowermost ticket at a point slightly below the upper surface thereof when the shuttle blade 64 moves to the right as viewed in FIG. 7.

The piston and cylinder assembly 62 is adapted to be actuated in a manner to be described first to move to the right as viewed in FIG. 7 and then to return to the position shown in FIG. 7. In response to this operation, shoulder 66 engages the lowermost ticket and moves it out of the magazine through a suitably sized gate block opening 67 onto ledges 68 provided on the top of the base plate 52 below a cover plate 70 secured to base plate 52 by screws 72. This is the "ready" position of a ticket 26. When the shuttle blade 64 returns to the position shown in FIG. 7, the ticket 26 which was moved from the magazine 48 rests on ledges 68 in front of a second step 74 formed in the blade 64. Step 74 is chamfered downward and backward with relation to the direction of shuttle feeding movement at an angle of about 45°. The height of this step is such that the base of the step is somewhat below ledges 68 while the upper edge of the step extends above a ticket 26 resting on the ledges 68.

On the next operation of the shuttle 54 the ticket 26 which had been resting on ledges 68 is moved by the step 74 onto the ledges 28 at the sides of the V-shaped recess 30 in block 32. At the same time the lowermost ticket 26 in magazine 48 is moved to the ready position on ledges 68.

From the structure just described, it will readily be apparent that tickets are fed from the magazine 48 endwise to the ledges 28 over the recess 30.

Referring now to FIGS. 1 and 7 to 9, a shaft 76 carried by brackets 78 on the top 14 rotatably supports an arm 80 provided with a clamping head 82. We secure a generally U-shaped material guide 84 formed of resilient material to the arm 80. Normally under the influence of gravity, guide 84 rests on the block 32 and the arm 80 occupies the position shown in FIG. 7.

An air cylinder 86 is adapted to be supplied with air under pressure in a manner to be described to drive its piston shaft 88 downwardly as viewed in FIG. 7. Shaft 88 carries a head 90 coupled to the arm 80 by a slot 91 in the arm to cause head 82 to be moved in response to movement of shaft 88. Head 82 has a cross-sectional shape generally complementary to that of the recess 30. When a length of material 92 is positioned over the guide 84 and cylinder 86 is supplied with air under pressure, head 82 moves from the position shown in FIG. 8 to the position shown in FIG. 9. In the course of this movement the head moves the fabric 92 down into engagement with a ticket 26 supported on ledges 28 and then moves the material 92 an the ticket 26 into the recess 30 to form a bend in the ticket and material to perit the filament to be advanced therethrough in a manner to be described.

One of the brackets 78 also pivotally supports a switch actuating arm 94 adapted to be pivoted in response to pressure exerted by the operator on a plate 96 carried by the arm to actuate a microswitch 98 on a bracket 78 to initiate operation of the apparatus in a manner to be described.

Referring now to FIGS. 1, 2 and 3 to 6, the filament feeding apparatus of our merchandise tagging system includes a needle guide housing 100 provided with a bore 102. We mount a fixed guide needle support 104 in bore 102 adjacent one end thereof. Support 104 has a recess 106 which receives the base 108 of the fixed guide needle 110. A snap ring 112 retains the head 108 in recess 106. Respective guides 113 and 115 direct filamentary material 22 from the reel 20 to the support 104.

A screw 114 retains a spring 116 in a lateral bore in support 104. Spring 116 urges a drag brake 118 formed from a suitable material such, for example, as polytetrafluorethylene, into engagement with a length of filamentary material 22 passing through the support and the stationary needle 110.

We mount the movable needle supporting slide 120 within the bore 102. A snap ring 122 retains the base 124 of the movable guide needle 126 within a recess 128 in the slide 120. A pin 130 pivotally connects ears 132 extending from slide 120 through a slot 134 in housing 100 to a driving link 136. We provide link 136 with a slot 138 adapted to be engaged by a driving head 140 carried by the shaft 142 of a piston and cylinder assembly indicated generally by the reference character 144 adapted to be supplied with fluid under pressure to drive the head 140 first to the right and then to the left as viewed in FIG. 2. An arm 146 on link 136 carries a clamp 148 extending into a transverse bore 10 in slide 120. Bore 150 leads into a central, axially-extending bore 152 of the slide 120.

With with the slide 120 in the position shown in FIG. 2, the stationary needle 110 is disposed in the bore 152 and a short length of the material extends from the end of needle 110 to the base 124 and past the bore 150. In that position of the parts, a bracket 54 secure to the guide 100 by bolts 155 or the like supports a lug 156 on carriage 136 to position arm 146 so that the clamp 148 is out of engagement with the length of filamentary material 22 extending from the end of needle 110 toward base 124 of needle 126. When in a manner to be described carriage 136 begins to move to the right, as viewed in FIG. 2, lug 156 moves off bracket 154 and arm 146 moves under the influence of head 140 slightly in a counterclockwise direction to move clamp 148 into the bore 152 to clamp the filamentary material against a block 158 of resilient material at the side of the bore 152. Once this clamping action takes place, the filamentary material will be carried along with the slide 120 against the action of the drag brake 118.

After the assembly 144 has completed its feeding stroke, the direction of movement of head 140 reverses in a manner to be described to move carriage 136 to the left. When this occurs, the force exerted by head 140 on carriage 136 tends to move the arm 146 in a clockwise direction to move clamp 148 out of engagement with the filamentary material. The drag brake 118 holds the filamentary material in the position to which it has been moved under the action of the clamp 148.

From the structure thus far described, it will be apparent that when head 140 moves to the right as viewed in FIG. 2 a length of filamentary material is moved along with the slide 120. Block 32, which may be integral with guide 100, has a bore 160 leading from the end of bore 102 into the V-shaped recess 30. A bore 162 aligned with the bore 160 leads into the recess 30 at the other side thereof. When the movable needle 126 moves with slide 120, it moves along bore 160 and across recess 30 into the bore 162. As will be apparent from the description given hereinafter, before this movement takes place, head 82 is moved into the recess 30 to move a ticket 26 and the material 92 down into the recess. We provide the head 82 with a slot 164 which permits the needle 126 to move across opening 30. Thus the needle 126 with which the filament 22 moves under the action of slide 120 pierces both the ticket 26 and the material 92 in the course of its movement along bore 160 and across recess 30 into bore 162.

Referring now to FIGS. 1, 2 6 and 9, a bore 166 extending laterally across the bore 160 supports a cutter 168 for reciprocating movement across the bore 160. A solenoid 170 is adapted to be actuated to move the cutter across the bore to cut a length of filamentary material which has been advanced into position through the material 92 and through the ticket 26. A spring 172 is provided for returning the cutter 168 to its withdrawn position.

Referring to FIGS. 1, 2, 8 and 9, respective recesses 174 and 176 at the sides of the recess 30 receive heating elements 178 and 180 adapted to be energized in a manner to be described to heat the ends of a cut length of filament to form balls or heads 182 thereon as shown in FIG. 9.

Referring now to FIG. 13 we have shown one form of control circuit which may be employed to control the operation of our apparatus. Power switches PS-1 and PS-2 are adapted to be operated by a linkage 188 to connect the terminals 190 and 192 of a suitable source of supply voltage to conductors 194 and 196. We connect an auto transformer 198 across the conductors 194 and 196. A relay switch 1R-1 normally connects the heating elements 178 and 180 in series between conductor 194 and a low voltage tap 200 on the winding 198. A winding 1R connected in series with a push button switch PB, corresponding to switch 98, across conductors 194 and 196 is adapted to be energized to operate switch 1R-1 to connect the heaters 178 and 180 to a relatively higher voltage tap 202 on winding 198 when the machine is operated. When switch PB is closed, winding 1R not only operates switch 1R-1 to supply a relatively higher voltage to the heaters 178 and 180 but it closes a switch 1R-2 to complete a holding circuit for winding 1R through a switch 3R-2.

In response to operation of winding 1R, a normally open switch 1R-3 closes to complete the circuit of a solenoid winding S1 through a normally closed switch 1R-2. Solenoid S1 operates a valve indicated generally by the reference character 204 against the action of a spring 206. In the normal position of valve 204 one of the valve ports 208 is connected to a source of fluid under pressure while the other valve port 210 is connected to the atmosphere. When solenoid S1 is energized the connections are reversed so that port 210 is connected to the source of pressure and port 208 is connected to the atmosphere. Valve 204 controls the operation of the needle drive cylinder 144. We connect the normally pressurized port 208 to a line 220 leading to one end of cylinder 144. Thus, in the normal position of valve 204, head 140 is in its extreme left position as viewed in FIG. 2. We connect port 210 of valve 204 to a line 224 leading to the other end of cylinder 144. Thus, when valve 204 is actuated, head 140 moves to the right as viewed in FIG. 2.

Winding 1R, when energized, also closes switch 1R-4 to energize a solenoid S4 through a switch 3R-2 to operate a valve assembly, indicated generally by the reference character 216 having control ports 218 and 220 connected, respectively, to lines 212 and 214 of cylinder 86. In the normal position of assembly 216, fluid under pressure is applied to line 212. When S4 is energized, fluid under pressure is applied to line 214 to move head 82 downwardly as viewed in FIG. 7.

From the structure just described, it will be apparent that when element 96 is actuated to close switch PB winding 1R is energized to operate switch 1R-1 to apply a relatively higher voltage to heaters 178 and 180, to close switch 1R-2 to complete the holding circuit for winding 1R through switch 3R-2, to close switch 1R-3 to energize solenoid S1 through switch 2R-2, and to close switch 1R-4 to complete the circuit of solenoid S4. We connect a delay device 211 between switch 1R-3 and winding S1 to ensure that the head 82 is down before the needle advances.

At the end of its driving stroke, head 140 operates a limit switch LS1 to complete the circuit of a relay winding 2R. Energization of winding 2R opens switch 2R-2 to interrupt the circuit of solenoid S1 to permit valve 204 to assume its initial position and to begin the return stroke of head 140. Winding 2R also closes switch 2R-1 to complete its holding circuit through a normally closed switch 3R-1.

As head 140 returns to its initial position it momentarily actuates a limit switch LS2 to complete the circuit of a winding 4R to close respective switches 4R-1 and 4R-2. Switch 4R-2 energizes a solenoid winding S2 to actuate the cutter 168. Switch 4R-1 applies a pulse to a delay network 226 which after a short interval of about 1½ seconds energizes winding 3R. Winding 3R opens switches 3R-1 and 3R-2. Upon opening of switch 3R-2 the holding circuit of winding 1R is broken and switch 1R-1 returns the heaters 178 and 180 to their lower voltage condition. Moreover, S4 is deenergized to return valve 216 to it initial position. Opening of switch 3R-1 breaks the holding circuit for winding 2R so that the circuit of solenoid S1 is again conditioned for operation. We so arrange switches 3R-1 and 3R-2 that switch 3R-2 opens slightly before switch 3R-1 to prevent reenergization of solenoid S1 when switch 2R-2 closes.

Winding 3R also closes switch 3R-3 to energize a winding 5R to close a switch 5R-1 to complete a holding circuit for winding 5R through a normally closed limit switch LS3. Winding 5R also closes a switch 5R-2 to energize solenoid S3 which operates a valve indicated generally by the reference character 228 which controls the piston and cylinder assembly 62. We connect one outlet port 230 of the valve 228 to a line 232 leading to the interior of cylinder 62 at one side of the piston to hold the shuttle 54 in the retracted position shown in FIG. 7 when solenoid S3 is deenergized. A port 234 of valve 228 supplies fluid under pressure to a line 236 leading into cylinder 62 when winding S3 is energized to move the shuttle 54 to the right as viewed in FIG. 7 to feed a ticket 26 to the fastening station. A push button switch PB2 may be operated to energize winding S3 manually to set the machine up for operation as will be described hereinbelow. At the end of the forward stroke of the shuttle 54 the limit switch LS3 is opened to interrupt the holding circuit of winding 5R.

Referring now to FIGS. 10 and 11 we have shown one form of our fastener as applied to an article such as the material 92. The length of filamentary material 22 passes through the ticket 26, through the fabric to the underside thereof, back up through the fabric and through the ticket 26. The heads 182 which we form on the length 22 during the fastening operation retain the ticket on the material 92. Moreover, these heads cannot be removed without destroying the fastener so that the ticket 26 cannot be removed and replaced.

Figure 12:
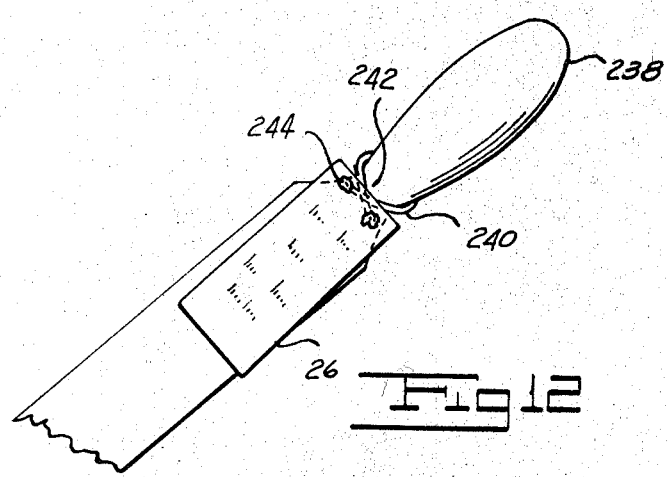
FIG. 12 is a perspective view of another application of our fastener.

Referring now to FIG. 12 we have shown another application of our fastener for securing a ticket 26 to the handle 238 of an article such as a garden tool or the like. In this application of our fastener, the length 240 of material extends around the neck 242 of the handle. The ends of the length 240 having the heads 244 formed thereon pass through the ticket 26 to retain it on the handle and prevent it from being removed without destroying the fastener. It will readily be appreciated that this form of our fastener requires a modified apparatus from that shown in FIGS. 1 to 11. That is, it would require a curved needle.

In the specific form of our apparatus shown in the drawings, we have illustrated fluid-operated piston and cylinder assemblies for operating the clamping head, the filament feeding apparatus 34, and the ticket feeding apparatus. We have shown a solenoid for operating the cutter. It will readily be appreciated that the piston and cylinder assemblies could be replaced by solenoid drives and that the solenoid drive could be replaced by a fluid-operated piston. Moreover, we contemplate that any other suitable form of drive means such, for example, as cams and followers might be employed.

To set up our apparatus we first feed the length of material 22 into the support 104 past the drag brake 118, through needle 110, past the clamp 148 and through the needle 126 to a position at which it extends slightly beyond the end of the needle 126 so as to be visible. Thus we endure that material is available to fasten the ticket on the initial operation. We next operate the ticket feeding mechanism as by operating push button PB2 to feed a ticket 26 into position over the recess 30. Our apparatus is now ready for operation. Power switches PS-1 and PS-2 are closed to place heaters 178 and 180 in low heat condition owing to the connection provided by switch 1R-1 and tap 200.

In operation of our apparatus a piece of material 92 is placed over the guide 84 and plate 96 is pushed to close switch 98 represented as PB1 in FIG. 13. Winding 1R closes to operate solenoid S1 to actuate valve 204 to apply fluid under pressure to port 224. At the same time solenoid S4 operates to apply pressure to line 214. head 82 moves down over the fabric and ticket 26 to conform them to the shape of recess 30 as shown in FIG. 9. Head 140 moves to the right as viewed in FIG. 2 to begin advancing needle 126. This needle moves relative to the filament which is held by the drag brake 118 until lug 156 rides off the support 154. Enough relative movement is permitted to ensure that the exposed end of the filament is covered by the needle 126. As soon as the lug 156 leaves bracket 154, arm 146 moves slightly in a counterclockwise direction to engage clamp 148 with the filament so that the latter is carried along with needle 126.

Needle 126 continues its forward movement through bore 160, across the recess 30 and into the bore 162. In the course of this movement it successively pierces the ticket, the material, the material and the ticket. At the limit of the forward movement of needle 126, limit switch LS1 operates to energize winding 2R to open the circuit of solenoid S1 to return valve 204 to a position at which the operation of cylinder 144 is reversed. Then as head 140 continues its return movement, the filament remains in the position to which it has been moved owing to the action of the drag brake 118. At the end of the return movement of head 140, LS2 is momentarily operated to energize winding 4R to operate solenoid S2 to cause the cutter to cut the filament. The ends of the filament are exposed to the heat of heaters 178 and 180 to melt the material to form the balls or heads 182. After a delay winding 3R is energized to interrupt the circuit of the solenoid winding S4 and to interrupt the holding circuit of winding 1R.

As has been explained hereinabove, switch 3R-2 opens slightly before switch 3R-1 to avoid reenergization of winding S1.

Switch 3R-3 closes under the action of winding 3R to energize winding 5R to cause solenoid S3 to actuate valve 228 to feed a fresh ticket 26 onto the ledges 28 at the sides of the recess 30. The machine is now ready for its next operation.

Figure 18:
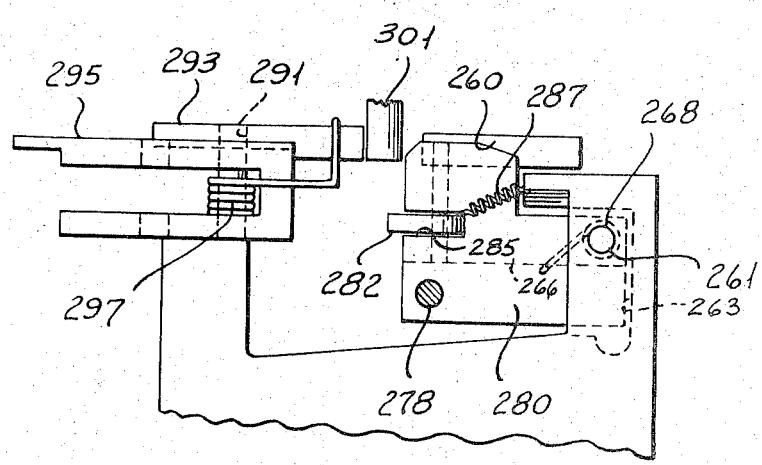
FIG. 18 is a fragmentary elevation of the clutch mechanism with parts shown in section, taken along the line 18–18 in FIG. 17.

Referring now to FIGS. 14 and 18 we have shown an alternate form of our apparatus for tagging articles which includes a base 246 and a cover or top 248 supported on the base. We provide this form of our device with a drive motor 250, the output shaft of which provides the input for a right angle drive 252 having an output shaft 254. We mount a ratchet wheel 256 on shaft 254 for rotation therewith. When the machine is set into operation, ratchet wheel 256 rotates continuously.

We mount an assembly of a cam 258 and a pawl housing 259 loosely on the shaft 254. The housing 259 carries a clutch pawl 260 supported for pivotal movement around a shaft 262 and normally urged into engagement with the ratchet by a spring 264.

A pin 261 disposed in a recess 263 in a stationary plate 265 pivotally supports a block 266. A spring 268 normally urges the block 266 to a position at which it engages the upper wall of the recess. With the block in that position and with the cam in its home position, pawl 260 is held out of engagement with ratchet 256. As will be explained hereinafter, when a securing operation is to be performed, block 266 is actuated to permit the pawl to engage the ratchet to clutch the cam 258 to the shaft 254.

We secure a pair of spaced crank arms 270 to a shaft 272 rotatably supported on the machine frame. A plate 274 is adapted to be manually actuated to initiate a machine operation to rotate shaft 272 in a clockwise direction as viewed in FIG. 14. Shaft 272 extends toward the center of the machine and carries another crank arm 276 for rotation therewith. The inner end of crank 276 is connected by a link 278 to a plate 280 pivotally supported on pin 261. Plate 280 forms one element of a releasable coupling including a link 282 pivotally supported on a pin 283 in a slot in block 266. Link 282 is adapted to nest in a notch 285 in plate 280. A spring 287 normally urges link 282 into engagement with the notch 285. When the plate 274 is actuated to move link 278 down the engaged coupling including plate 280 and link 282 moves the block 266 downwardly against the action of spring 268 and out of the path of pawl 260. Spring 264 then moves the pawl into engagement with the ratchet wheel 256 and shaft 254 drives the cam.

Figure 17:
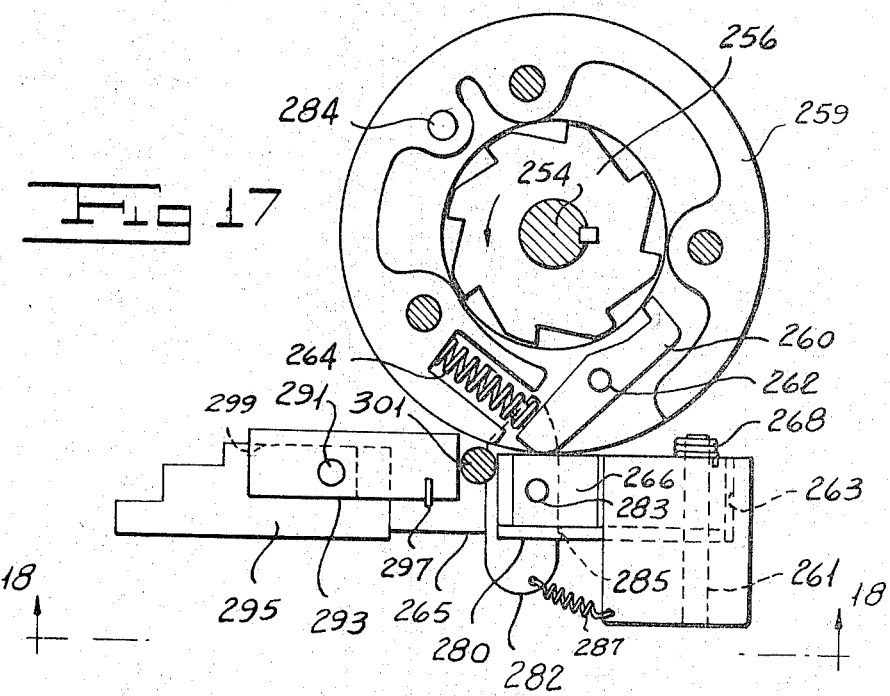
FIG. 17 is a fragmentary sectional view illustrating the clutch mechanism of the form of our apparatus shown in FIG. 14.

We so arrange our machine that block 266 is reset at about a half revolution of cam 258 even though the operator continues to press plate 274. A reset pin 284 on the housing 259 engages link 282 to pivot it in a clockwise direction on pin 283 as viewed from the top in FIG. 17. Thus link 282 is disengaged from plate 280 and spring 268 resets block 266. When the plate 274 is released a return spring 289 restores the link 278 to its initial position. Plate 280 is thus returned and link 282 snaps into notch 285 to reestablish the coupling.

We provide our machine with means for positively positioning the cam assembly at the end of an operation of the machine. A pin 291 pivotally mounts a stop arm 293 on a bracket 295 on plate 265. A spring 297 urges arm 293 to a position at which a shoulder 299 on the arm engages the edge of bracket 295. In the position of the arm and with block 266 in its up position the arm and the block define a space for the reception of a stop pin 301 on cam 258. When an operation is initiated by lowering block 266 pin 301 is freed. As is explained hereinabove at a point about halfway through an operation the block is restored to its initial position even if plate 274 is not released. As the cam completes a revolution the pawl 260 strikes the block 266 to disengage the cam from its drive. A short time thereafter pin 301 strikes arm 293 to pivot it against the action of spring 297. The pin rides past the arm and engages the end of block 266. Arm 293 snaps back. In this way we prevent any overriding of the cam assembly and also avoid any bounding back of the assembly.

Figure 16:
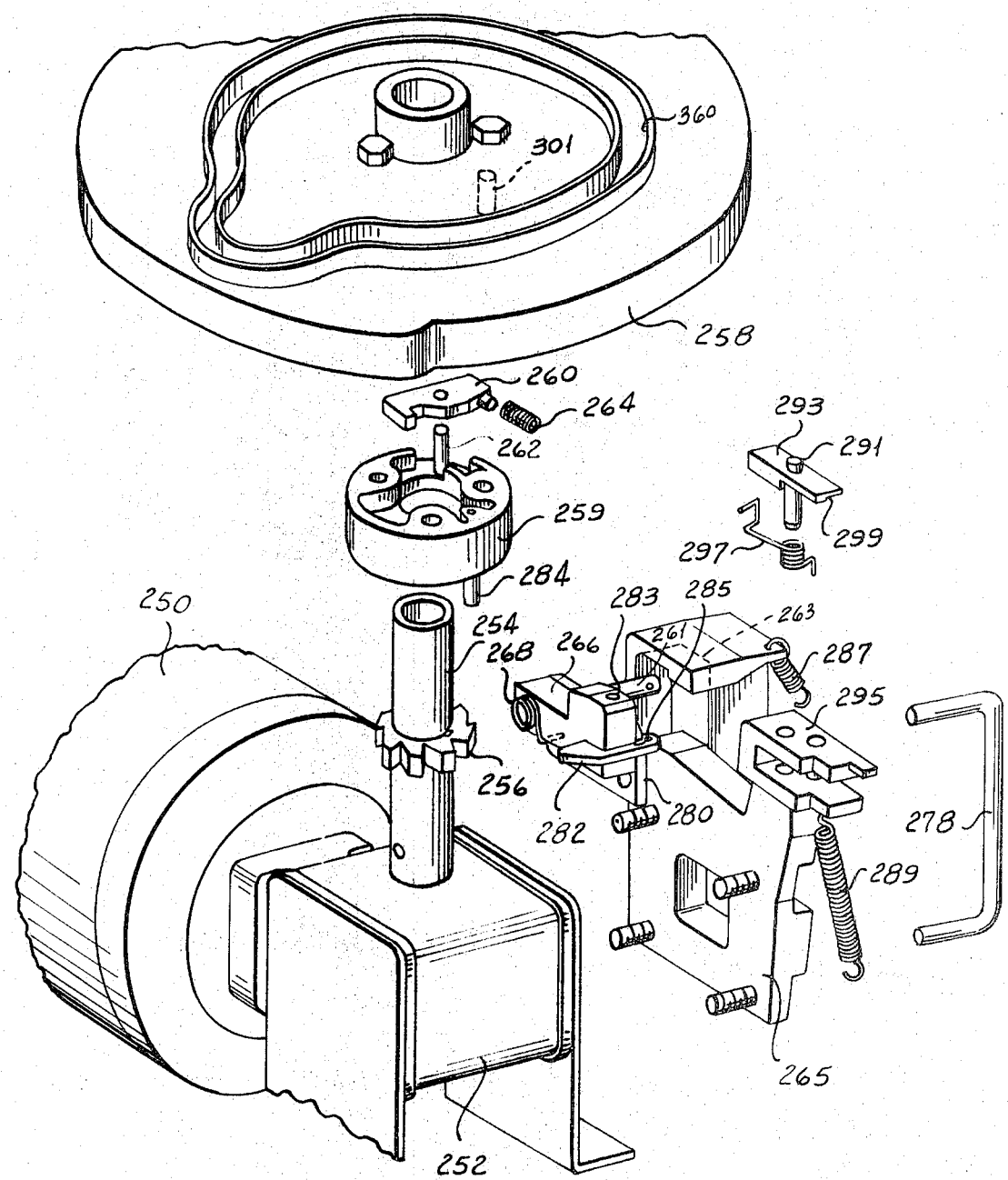
FIG. 16 is an exploded perspective view illustrating the relationship of the parts of the driving mechanism of the form of our apparatus shown in FIG. 14.

Referring now to FIGS. 15 and 16, we provide the underside of the cam 258 with a cam track 286. A bracket 288 carries a pivot 290 which supports a lever 292 carrying a follower 294 which rides in track 286. The free end of lever 292 has a slot 296 which receives a pin 298 on the shuttle slide 54. In response to rotation of cam 258, track 286 oscillates lever 292 to reciprocate the shuttle blade 54. Since the operation of the shuttle is substantially the same as that described in connection with the form of our apparatus shown in FIGS. 1 to 9, it will not be described in detail.

As will be explained hereinafter, one difference between the form of our invention shown in FIGS. 14 to 21 from that shown in FIGS. 1 to 9 is that a ticket or article to be secured to another article is fed into position prior to the securing operation. The ticket in this form of our invention is received in guides 300 in position at which a garment or the like may be moved under the ticket.

A second track 302 in the underside of cam 258 receives a follower 304 carried by one end of a lever 306 pivotally supported by a pin 308 in bracket 295. The end of lever 306 is bifurcated to receive a pin 310 carried by a slide 312 supported in guides 314 and 316. As cam 258 rotates lever 306 oscillates around the pivot 308 to reciprocate the slide 312. We form the slide 312 with a slot 318 which receives a pin 320 extending through slots 322 in a pair of spaced bell cranks 324 rotatably supported on a pivot pin 326 carried by a bracket 328 on the base 346.

A shaft 330 swingably supports the clamp arm 332, the head of which is formed with a slot 334 through which the needle may pass in a manner to be described. A pair of links 336 connect the arm 332 to the bell cranks 324. We dispose a spring 338 in the slot 318 to provide a resilient connection between the slide 312 and the bell cranks 324. In this manner we can accommodate different thicknesses of fabric or the like to which a tag is to be secured. It will readily be appreciated that when lever 306 rotates in a counterclockwise direction as viewed in FIG. 15, slide 312 moves to the right and bell cranks 324 are driven through the resilient connection 338 to pivot in a clockwise direction to move the clamping arm head up into the recess 340 under which the ticket is supported by guides 300.

A spring 342 urges a follower 344 carried by a lever 346 into engagement with the periphery of the cam 258. We pivotally mount lever 346 on a shaft 348 carried by a side of the machine frame. The end of lever 346 remote from the follower 344 carries a pin 350 and is disposed in a slot 352 in the cutter blade 354 slidably supported in a slot in the cutter block 356. When the raised portion 358 of the peripheral cam is in engagement with follower 344, blade 354 is retracted. When, however, the follower rides off the raised cam portion, spring 342 drives the cutter blade across the path of the filament in a manner to be described to cut the length which has been passed through the ticket or the like and the article to which it is to be secured.

Referring to FIGS. 15 and 19 to 21, we form the upper surface of the cam 258 with a cam track 360 which receives a follower 362 carried by a lever 364 pivotally supported by a shaft 366 carried by the top 248 of the machine. The end of lever 364 remote from the pivot 366 is bifurcated to receive a post 368 of the filament feeding mechanism indicated generally by the reference character 370. We mount this feed mechanism 370 on the top 248 of this form of our machine. A stationary bar 372 carried by the top 248 slidably supports the needle drive carriage 374 carrying the pin 368. A post 376 on carriage 374 carries a movable needle support 378 on which we mount the movable needle 380 in this form of our device.

A support bracket assembly indicated generally by the reference character 382 carries a pair of shafts 384 and 386. Shaft 384 supports a steel roller 388 while shaft 386 supports a rubber-covered roller 390. We pass the filament 22 through a guide bore 392 in the assembly 382, through the nip between the rolls 388 and 390 and into the stationary needle 394 carried by the assembly 382. The filament then passes through a guide 396 on the support 378 which in one position of the parts is adapted to telescope over the stationary needle 394. After passing through a bore 398 in the support 378, the filament extends into the movable needle 380. Shaft 386 may be manually turned by a knob 387 to feed the filament.

We mount a one-way clutch assembly indicated generally by the reference character 400 on the shaft 384. The driving element 402 of clutch 400 carries a gear 404 adapted to be driven in a manner to be described. We mount element 402 loosely on the shaft 384. In one direction of rotation of the element 402, clutch 400 provides a driving engagement between that element and the driven element 406 carried by shaft 384 for rotation therewith. Shaft 38 carries a gear 408 which meshes with a gear 410 carried by shaft 386 for movement therewith. Owing to the arrangement just described, for one direction of movement of gear 404 both shafts 384 and 390 are driven. In the other direction of movement of gear 404 the driven element 402 idles and the parts do not rotate. A spring 412 urges a nylon braking element 414 into engagement with roller 388. This brake permits the rollers 388 and 390 to be positively driven under the action of a rotation of gear 404 but prevents any unintended rotation thereof in the reverse direction.

The mechanism 370 includes a rack carrier 416 having a slot 418 through which a post 420 on carriage 374 extends. An extension 422 on the support 416 slides on a guide rod 424 carrying a spring 426 which acts as a shock absorber as carrier 416 moves to the right-hand limit of its movement as viewed in FIG. 19. The support 416 carries a rack 428 which extends from the support to a position at which it engages gear 404.

A stud 430 supports one end of a needle stiffener carrier 432, the other end of which engages a needle stiffener 434 through which the movable needle 380 extends. The stiffener itself is adapted to move into a bore 436 in the cutter block 356. A spring 440 urges the stiffener carrier 432 to the right as viewed in FIG. 19. Lateral extensions 442 are adapted to be engaged by the posts 376 and 420 to retract the stiffener in a manner to be described.

In operation of the form of our invention shown in FIGS. 14 to 21, when a ticket or the like is to be secured to an article, the article is inserted between the head of the clamping arm 332 and the recess 340 and plate 274 is actuated to pivot shaft 272 to move link 278 downwardly to carry block 266 downwardly to permit the pawl 260 to move into engagement with the continuously rotating ratchet 256. As is explained hereinabove, normally the plate 274 is released after its actuation to permit block 266 to reset so that after one revolution of the cam 258 pawl 260 reengages the block and moves out of engagement with ratchet 256. Even if the plate is not released, the pin 284 on the cam assembly resets the block by actuating link 282. At the end of a revolution just after the pawl is disengaged, the stop pin 301 on the cam assembly engages the block to arrest the cam.

Upon initiation of an operation in the manner just described, cam 258 rotates in a counterclockwise direction as viewed in FIG. 15. From the position shown in that FIG., cam track 286 first actuates follower 294 to move it to the left as viewed in the FIG., to rotate lever 294 in a clockwise direction about its pivot 290. After a predetermined rotation of the cam, the follower returns to its initial position and lever 294 rotates in a clockwise direction back to the full-line position shown in the FIG. Under the action of that movement the pin 298 on the shuttle blade reciprocates to drive the blade to feed a ticket to the supports 300 in the manner described hereinabove in connection with the form of our invention shown in FIGS. 1 to 9.

Following the ticket feeding operation, the clamping arm head moves up into the recess 340 to clamp the fabric and the ticket in a position to receive a length of filamentary material. To achieve this operation, track 302 actuates follower 304 to pivot lever 306 in a counterclockwise direction around its pivot 308. It will readily be understood that the cam tracks are so arranged that the clamp arm 332 begins to move upwardly during the return of the ticket feeding shuttle. That is to say there is a slight overlap in the cam tracks. As the lever 306 pivots in a counterclockwise direction, pin 310 moves to the right to drive a bar 312 carrying the spring 338 which transmits the driving force to bell cranks 324 to operate links 336 to raise arm 332. The clamp remains in its up position until the fastening operation is complete at which time follower 304 and arm 306 are returned to the full-line positions shown in the FIG.

After the clamping operation takes place, track 360 moves follower 362 outwardly of the axis of shaft 254 and lever 364 moves first in a counterclockwise direction to advance the needle assembly and then in a clockwise direction to retract that assembly. In the course of the counterclockwise movement of lever 364 post 368 moves to the right as viewed in FIG. 19 from the full-line to the broken line position thereof. During the preceding operation, a short length of filament 22 was left extending beyond the end of the movable needle 380. During the initial portion of the feeding movement of carriage 374, rod 420 moves along the length of slot 418 without driving the rack support 416. It carries the movable needle 380 through a distance sufficient to house the exposed end of the filament. In the course of that initial movement, the stiffener carrier 432 moves with the carriage 374 under the influence of spring 440.

Following the initial movement of the carrier 374, the post 420 engages the leading end of the slot 418 to draw the rack support 416 along with carrier 374. When this occurs, rack 428 rotates gear 404 in one direction. We so arrange clutch 400 that it provides an engagement between the driven and driving members 402 and 406 for that direction of movement of gear 404. Owing to this fact, as the rack advances rolls 388 and 390 are driven to advance the filament with the movable needle 380 following the initial movement of the latter. As the movable needle arrives at a position just before that at which it is to pierce the article and the ticket or the like, actuator 432 strikes block 438 to hold the stiffener against movement to permit the movable needle 380 to move out of the stiffener and pierce the article and the ticket during the terminal portion of the movement of carriage 374. We have illustrated this position of the parts in broken lines in FIG. 19.

After the movable needle has pierced the ticket and the article, the direction of movement of carriage 374 reverses. During this reverse movement rack 428 drives gear 404 in the direction but the riven member 402 merely idles and rollers 388 and 390 are not driven to retract the filament. To the contrary, brake 412 restrains the rollers against movement so that the filament remains in the position at which it passes through the article and the ticket as the movable needle 380 is retracted. During the initial retracting movement of carriage 374 the stiffener carrier 432 remains in position against block 438 under the influence of spring 440. In the course of the return stroke of carriage 374, rods 420 and 376 engage the extensions 442 on the stiffener support 432 to return it to its initial position against the action of spring 440. The rack support 416 returns with the carriage under the action of spring 426 until it abuts spring-loaded stops 444. After that occurs, the carriage 374 continues its movement until rod 420 moves through the length of slot 418.

When the filamentary material has been through the article and the ticket in the manner described, the follower 344 rides off the high cam portion 358 and spring 342 urges it into engagement with the low portion of the peripheral cam to move lever 346 in a clockwise direction to drive the cutter blade to cut the length of material which has been passed through the tag and the article. A suitable simple electrical control circuit for the form of our invention can readily be arrived from a consideration of the circuit shown in FIG. 13. When a power switch such as the switch PS is operated motor 250 is energized and heaters 178 and 180 are turned to low heat. The only additional electrical operation required is to turn the heaters to high heat. This operation may be synchronized with operation of the clamping head 332. For example, slide 312 can operate a switch 444 in its position to the right as viewed in FIG. 14. For example, as indicated schematically in FIG. 14, a boss 446 on the slide 312 may operate the switch. Finally the clamping head is released and, as cam 258 completes a revolution the machine is ready for the next operation.

It is to be noted that, owing to the fact that the tag or ticket is between the heaters and the fabric or the like, the latter is shielded from heat as the heads are formed. Further, the relatively small pierced holes in the ticket or tag arrest the formation of heads as they approach the holes in the course of their formation.

It will be seen that we have accomplished the objects of our invention. We have provided a merchandise tagging method and apparatus which obviates the problem of ticket switching by dishonest persons. Our system is more secure than are tagging systems of the prior art. The fastener of our system is less expensive than are fasteners employed in the prior art. Our fastener avoids the possibility of injury by sharp points and the like. It is noncorrosive Our fastener while being secure is convenient to use.

It will be understood that certain features and subcombinations are of utility and may be employed without reference to other features and subcombinations. This is contemplated by and is within the scope of our claims It is further obvious that various changes may be made in details within the scope of our claims without departing from the spirit of our invention.

It is, therefore, to be understood that our invention is not to be limited to the specific details shown and described.

We claim:

1. Apparatus for driving a length of flexible filamentary material through a tag positioned at a tagging station including in combination a stationary guide having an elongated bore for receiving said material, a needle having a bore adapted to receive said material, means mounting said needle with its bore alined with said guide bore for movement between a position adjacent said guide and a position at which said needle has pierced said tag at said tagging station, means for moving said needle between said positions, means responsive to the initial movement of said needle toward said tagging station for clutching said material to said needle for movement therewith and means for restraining said material against movement with said needle during movement thereof away from said station.

2. Apparatus for securing tags to articles at a tagging station including in combination a die having a reentrant portion, a head having a slot therein, means mounting said head for movement between a position out of said portion and a position in said portion to form a bend in a tag and an article placed in superposed relationship over said portion, a supply of filamentary material, means for advancing a length of said material across said portion through said head slot and means for forming retainers on the ends of said length.

3. Apparatus for securing a tag to an article at a tagging station including in combination means for holding said tag and said article at said station in a position to receive a tag, a supply of flexible normally solid thermoplastic material, a relatively rigid carrier having an opening for receiving material from said supply, said carrier being adapted to be driven to carry said material through said tag and into retaining engagement with said article at said station, means mounting said carrier for movement between a first position remote from said station and a second position at which it carries said material through said tag and into engagement with said article, means for driving said carrier between said positions, means for clutching said material to said carrier during movement thereof from said first position to said second position, means for holding said material against movement with said carrier during movement thereof from said second to said first position, means for cutting a length of said material fed and means for heating the ends of said cut length to form heads on the ends thereof.

4. Apparatus for securing a tag to an article at a tagging station including in combination means for holding said tag and said article at said station in a position to receive a tag, a supply of flexible filamentary material, a relatively rigid carrier having an opening for receiving material from said supply, sad carrier being adapted to be driven to carry said material through said tag and into operative engagement with said article at said station, means mounting said carrier for movement between a first position remote from said station and a second position at which it carries said material through said tag and into retaining engagement with said article, means for driving said carrier between said positions, means for engaging said material with said carrier during movement thereof from said first position to said second position, means for holding said material against movement with said carrier during movement thereof from said second to said first position, means for cutting a length of said material fed and means for forming retaining means at the ends of said cut length.

5. Apparatus for securing a tag to an article at a tagging station including in combination means for holding said tag and said article at said station in a position to receive a tag, a supply of flexible filamentary material, a relatively rigid carrier having an opening for receiving material from said supply, said carrier being adapted to be driven to carry said material through said tag and into operative engagement with said article at said station, means mounting said carrier for movement between a first position remote from said station and a second position at which it carries said material through said tag and into engagement with said article, means for driving said carrier between said positions, means for clutching said material to said carrier during movement thereof from said first position to said second position, means for holding said material against movement with said carrier during movement thereof from said second to said first position and means for forming retaining means on the ends of said material fed through said tag and into engagement with said article.

6. Apparatus for securing a tag to an article including in combination means for deforming said tag and said article in deflected and superposed relative relationship, a supply of flexible normally solid thermoplastic filamentary material, means comprising a relatively rigid carrier for advancing a straight length of said material through said tag and through said article to position exposed ends of said length in spaced relationship to the deflected portions of said tag and of said article, means for heating the exposed ends of said length to form retaining heads thereon and means for actuating said deforming means and said advancing means and said heating means in predetermined timed relationship.

7. Apparatus for securing a tag to an article including in combination, means for deforming said tag and said article in deflected and superposed relative relationship, a supply of normally solid thermoplastic filamentary material, means for advancing a straight length of said material through said ticket and said article to position exposed ends of said length in spaced relationship to the deflected portions of said tag and of said article, means for heating the exposed ends of said length to form heads thereon and means for actuating said deforming means and said advancing means and said heating means in predetermined timed relationship.

8. Apparatus for securing a tag to an article including in combination a supply of normally solid thermoplastic filamentary material, means for advancing material from said supply through said ticket and through said article, means for cutting a length of said material advanced through said ticket and through said article to provide exposed ends of said length spaced from said tag and from said article, means for heating the exposed ends of said cut length to form heads thereon and means for actuating said advancing means and said cutting means and said heating means in predetermined timed relationship.

9. Apparatus for securing tags to articles at a tagging station including in combination, a magazine for holding a stack of tags a shuttle, means mounting said shuttle for reciprocating movement below said magazine, means for driving said shuttle with a feeding stroke and with a return stroke, said shuttle being provided with a downwardly and rearwardly chamfered step forming an edge for engaging a tag from said stack to advance said tag toward said station during the feeding stroke of said shuttle, means for holding a tag and an article in deflected superposed relationship at said station, a supply of normally solid filamentary thermoplastic material, means for advancing a length of said material from said supply through said deflected ticket and article at said station and means for applying heat to the protruding ends of said length to form heads thereon.

10. Apparatus for securing a first piece of material to a second piece of material at a station including in combination means for holding said first piece and said second piece at said station, a supply of flexible normally solid thermoplastic material, a relatively rigid carrier having an opening for receiving material from said supply, said carrier being adapted to be driven to carry said material through said first piece and into retaining engagement with said second piece at said station, means mounting said carrier for movement between a first position remote from said station and a second position at which it carries said thermoplastic material through said first piece and into engagement with said second piece, means for driving said carrier between said positions, means for advancing a straight length of said material with said carrier during movement thereof from said first position to said second position, means for holding said thermoplastic material against movement with said carrier during movement thereof from said second position to said first position, means for cutting a length of said fed thermoplastic material to provide exposed ends of said length spaced from said material, means for heating the ends of said cut length to form heads on the ends thereof and means for actuating said driving means and said material advancing means and said cutting means and said heating means in predetermined timed relationship.

11. Apparatus for securing two pieces of relatively thin flexible material including in combination means for clamping said pieces in superposed bowed relationship, said clamping means comprising a clamp having a passage with an axis extending through said superposed bowed pieces, piercing means provided with a bore having an axis substantially coaxial with said passage axis, means for feeding thermoplastic filamentary material from a supply through said bore, drive means for sequentially advancing said piercing means relative to said filamentary material for a predetermined distance and then advancing said piercing means together with said filamentary material through said passage and then through said bowed clamped materials and then retracting said piercing means, means for restraining said filamentary material against movement with said piercing means during said retracting thereof to leave said material in a position wherein it pierces said pieces, means for severing said filamentary material to leave a severed portion extending through said superposed bowed pieces, means for heating the ends of said severed portion to form beads thereon, means for deactivating said clamping means and means for actuating said clamping means and said drive means and said severing means and said heating means in predetermined timed relationship.

12. Apparatus for securing a tag to an article including in combination means for deforming said tag and said article in deflected and superposed relative relationship, a supply of flexible normally solid thermoplastic filamentary material, means comprising a relatively rigid carrier for advancing a straight length of said material through said tag and through said article to position actuating ends of said length in spaced relationship to the deflected portions of said tag and of said article, means for heating the exposed ends of said length to form retaining heads thereon and means for actuating said deforming means and said advancing means in predetermined timed relationship.

13. Apparatus for securing a tag to an article including in combination, means for deforming said tag and said article in deflected and superposed relative relationship, a supply of normally solid thermoplastic filamentary material, means for advancing a straight length of said material through said ticket and said article to position exposed ends of said length in spaced relationship to the deflected portions of said tag and of said article, means for heating the exposed ends of said length to form heads thereon and means for actuating said deforming means and said advancing means in predetermined timed relationship.

14. Apparatus for securing a tag to an article including in combination a supply of normally solid thermoplastic filamentary material, means for advancing material from said supply through said ticket and through said article, means for cutting a length of said material advanced through said ticket and through said article to provide exposed ends of said length spaced from said tag and from said article, means for heating the exposed ends of said cut length to form heads thereon and means for actuating said advancing means and said cutting means in predetermined timed relationship.